Jan. 20, 1931.     W. A. MOLYNEUX     1,789,876
HANDLE DEVICE FOR UTENSILS
Filed May 14, 1929
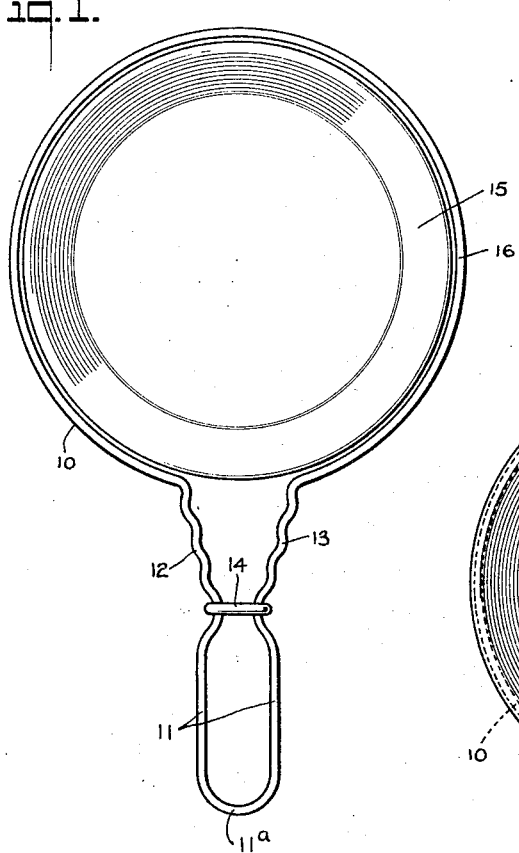
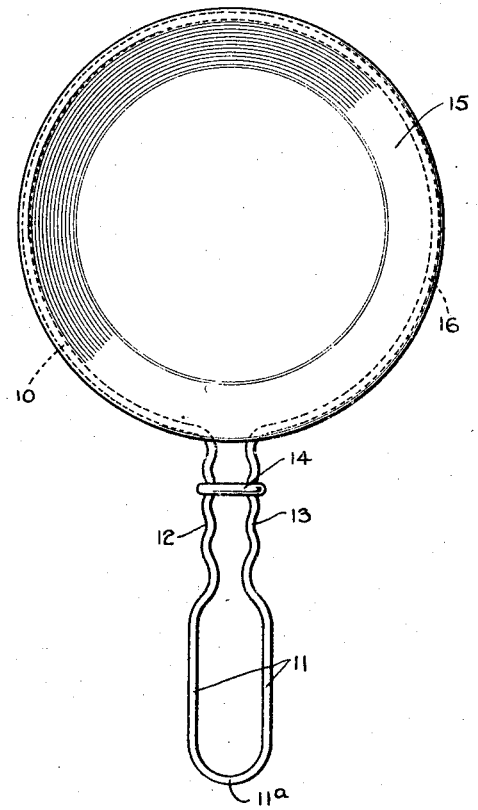
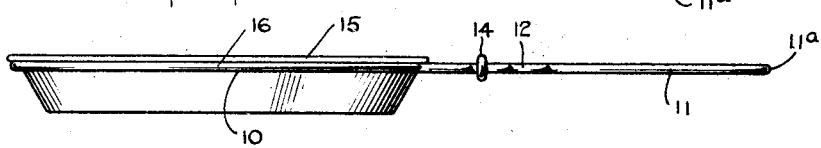
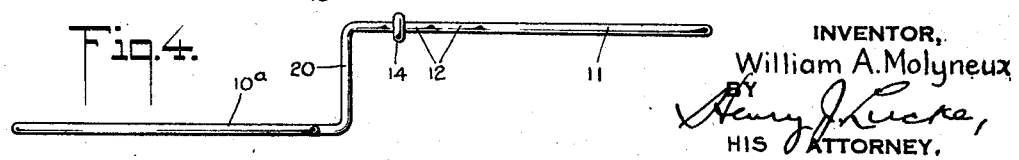
INVENTOR,
William A. Molyneux
BY
HIS ATTORNEY.

Patented Jan. 20, 1931

1,789,876

UNITED STATES PATENT OFFICE

WILLIAM A. MOLYNEUX, OF BLAIRSTOWN, NEW JERSEY

HANDLE DEVICE FOR UTENSILS

Application filed May 14, 1929. Serial No. 362,905.

This invention relates to handle means for removing or transporting utensils which are heated or otherwise.

Pursuant to my invention the handle means is formed of suitably stiff, resilient material such as a thin rod or strip of steel, formed at one end as a loop to be passed over the upper rim of the pie tin, baking dish, pan or the like, herein termed "utensil", when it is desired to remove such utensil from an oven or other location; the steel rod or strip at its opposite end is suitably formed as a handle, the intermediate portion being corrugated, waved or the like for co-action with a slip ring when moved in one direction effects the contracting of the loop end to positively position the loop end under the rim of the utensil to afford removal of the same by support under its upper rim, and upon movement in the opposite direction enables the loop end to expand under its own resiliency.

A most preferred form of my invention embodies a rod or strip of steel or the like, shaped as above described, which is integral or endless, the handle and intermediate portions being of two lengths of the rod or strip.

Further features and objects of the invention will be more fully understood from the following detail description of the accompanying drawings, in which Fig. 1 is a top plan view of my handle means, illustrating the same with the loop end expanded and about to be passed over the upper rim of the indicated pie tin;

Fig. 2 is a similar top plan view, illustrating my handle device applied to the pie tin, the loop end being contracted by the forward movement of the compressing ring;

Fig. 3 is a side elevation of Fig. 2; and

Fig. 4 is a side elevation of a modified form.

Referring to the drawings, my handle device comprises essentially the expansible loop portion 10, the handle portions 11 and the intermediate portions 12, 13. The loop portion 10 may be substantially circular and the handle portions 11 substantially rectilinear and of substantially rectangular outline. A thin rod or strip of steel may be employed as the material; I prefer a round rod of small diameter.

When the material is formed integrally, that is to say, with the loop 11a joining the handle portions 11, 11, enhanced resiliency is imparted to the inherent resiliency of the loop portion 10 in the expansion of the loop portion 10.

The intermediate portions 12, 13 may be corrugated or bent as indicated in the drawings, or otherwise provided with irregular contour serving as strips; these intermediate portions 12, 13, when the loop end is fully expanded, diverge outwardly from one another in the direction from the handle proper 11 toward the loop end 10.

Co-acting with the intermediate portions 12, 13, I provide the ring 14, preferably of rectangular, annular outline, as appears from a comparison of Figs. 1 and 2 with Fig. 3. Upon manually moving the ring 14 in the direction from the handle proper 11 the loop end 10 is contracted in its effective diameter, as appears from the comparison of Fig. 2 with Fig. 1 of the positions of the parts.

My invention is especially adapted for removing utensils such as pie tins, cooking pans, baking dishes and the like, having rims or other flanged formations at the top or at any other suitable location, thus enabling the loop end 10 of my handle device to be passed when suitably expanded above such cooking utensil and about and under such rim, whereupon the ring 14 is moved to suitable locking position to suitably contract the loop.

As is above indicated, Fig. 1 illustrates the use of my invention with a pie tin, the loop end being indicated in this figure as sufficiently expanded to pass over the upper rim 15 of the pie tin 16. In Fig. 2, the loop 10 has been contracted to position the same under the rim 15 of the pie tin 16 by the movement of the compressing and locking ring 14 from its position indicated in Fig. 1 to its position indicated in Fig. 2, the corrugations or other irregular contour of the intermediate portions 12, 13, serving to lock the ring 14 in its locking position.

After the cooking utensil has been removed from the oven or from any location, as desired, the reverse movement of the ring 14, as from its position shown in Fig. 2 to its position shown in Fig. 1, enables the loop end 10 to expand to a larger effective diameter, sufficiently to permit the loop end 10 to be passed about and over the upper rim or the like of the cooking utensil.

As is shown in Fig. 4, the loop may be offset from the handle, and in the particular embodiment of such form of my invention, the loop 10a is shown connected by the intermediate upwardly extending, opposite portions 20, to the handle 11, the locking ring 14 and the locking elements 13 being disposed adjacent to the handle members 11, to facilitate locking and unlocking of the handle for the purposes above described. Such offset form of my invention facilitates the removal of containers, the flange at the rim or below the rim of the container being disposed at a plane lower than the plane of the handle, useful, as for example, in removing preserving jars placed in a sterilizing bath or otherwise within a cauldron or the like.

It will be understood that the ring 10 may have an oval or other suitable curved formation.

In the commercial adaptations of my invention, my handle means may be made of different sizes of the loop, for corresponding ranges of effective diameter of cooking and other utensils.

My invention is applicable for use with pots and other types of utensils in general, that is to say, in factories and the trades for removal and transportation of the same, whether heated or not, in lieu of manual handling.

Whereas, I have described my invention by reference to specific forms thereof, it will be understood that many changes and modifications may be made without departing from the spirit of the invention.

I claim:—

1. A handle device comprising a continuous length of rigid resilient material formed at one end as a loop, said material being formed of substantially rectangular outline as a handle proper at its opposite end, the portions of said material intermediate said loop and said handle proper being divergent in the direction toward said loop and provided with locking recesses, and means coacting with said intermediate portion for contracting and locking said loop.

2. A handle device comprising a continuous length of rigid resilient material formed at one end as a loop, said material being formed of substantially rectangular outline as a handle proper at its opposite end, the portions of said material intermediate said loop and said handle proper being divergent in the direction toward said loop and corrugated, and loop means coacting with said intermediate portion for contracting and locking said loop.

3. A handle device comprising a continuous length of rigid resilient material formed at one end as a loop, said material being formed substantially rectilinearly as a handle proper at its end, the portions of said material intermediate said loop and said handle proper being divergent in the direction toward said loop and corrugated, and means coacting with said intermediate portion for contracting and locking said loop.

In testimony whereof I have signed this specification this May 6th, 1929.

WILLIAM A. MOLYNEUX.